United States Patent [19]

Brown

[11] 4,144,827

[45] Mar. 20, 1979

[54] EXPANDED ENTRY FOR PROGRAMMABLE MEMORY OF A SEWING MACHINE

[75] Inventor: Jack Brown, Union, N.J.

[73] Assignee: The Singer Company, New York, N.Y.

[21] Appl. No.: 900,027

[22] Filed: Apr. 25, 1978

[51] Int. Cl.$^2$ ............................................. D05B 3/02
[52] U.S. Cl. ................................. 112/158 E; 318/568
[58] Field of Search .......... 112/158 E, 121.11, 121.12; 318/568; 235/145 R; 340/365 R, 365 S

[56] References Cited

U.S. PATENT DOCUMENTS

| | | | |
|---|---|---|---|
| 4,014,275 | 3/1977 | Herr | 112/158 E |
| 4,074,642 | 2/1978 | Herr | 112/158 E |
| 4,085,691 | 4/1978 | Coughenour et al. | 112/158 E |
| 4,092,938 | 6/1978 | Coughenour et al. | 112/158 E |

FOREIGN PATENT DOCUMENTS 2738650  4/1978  Fed. Rep. of Germany ....... 112/158 E

*Primary Examiner*—Peter Nerbun

*Attorney, Agent, or Firm*—Edward P. Schmidt; Robert E. Smith; Edward L. Bell

[57] ABSTRACT

Means are disclosed for permitting entry of operator selected stitch points in a switch array which exceeds the capacity of the switch array. In a switch array for a programmable memory of a sewing machine, the columns of switches are representative of the needle position and the rows of switches are representative of fabric position determined by accumulation of feed increments. Each required feed increment is determined by the change of the present stitch position coordinate for feed over the just prior stitch position coordinate for feed. In order to provide for feed increments in the forward direction beyond the number of rows provided, an artificial signal is generated for the just prior stitch position coordinate for feed representative of the first row of switches. To provide for feed increment in the reverse direction, an artificial signal is generated for the just prior stitch position representative of the last row of switches. Feed increment is thus calculated from a new starting point permitting continued operation in a selected direction.

5 Claims, 6 Drawing Figures

| BINARY CODE TABLE | | |
|---|---|---|
| | COLUMNS | ROWS |
| 0000 | 1 | 1 |
| 0001 | 2 | 2 |
| 0010 | 3 | 3 |
| 0011 | 4 | 4 |
| 0100 | 5 | 5 |
| 0101 | 6 | 6 |
| 0110 | 7 | 7 |
| 0111 | 8 | 8 |
| 1000 | 9 | 9 |
| 1001 | 10 | 10 |
| 1010 | 11 | 11 |
| 1011 | 12 | 12 |
| 1100 | 13 | 13 |
| 1101 | | 14 |
| 1110 | | 15 |
| 1111 | | 16 |
*Fig. 4*
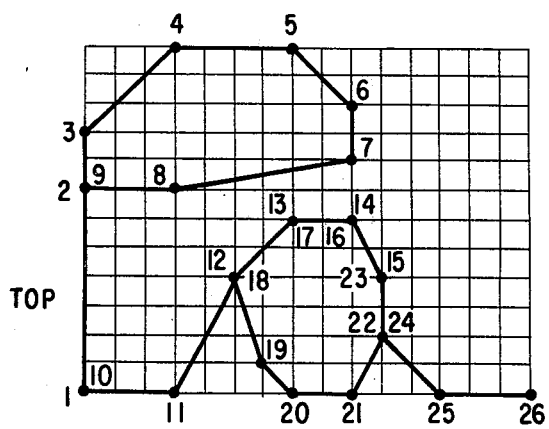
*Fig. 5a*
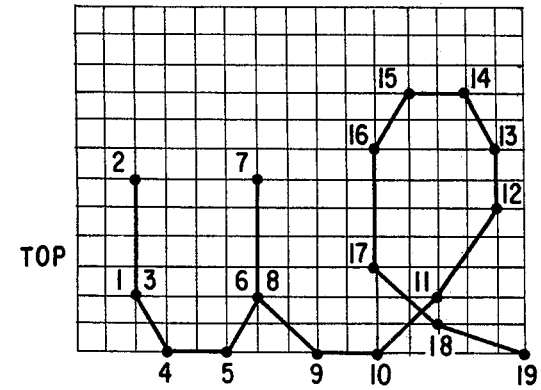
*Fig. 5b*

EXPANDED ENTRY FOR PROGRAMMABLE MEMORY OF A SEWING MACHINE

BACKGROUND OF THE INVENTION

This invention relates to programmable sewing machines programmable by means of a switch array, more particularly, to a means for permitting programming of a pattern longer in either direction than provided for by the switch array.

Recently, there have been developed, family sewing machines having the capability to accept in a static read-write memory, pattern information selected by, or designed, by a sewing machine operator. These recently developed programmable family sewing machines provided the sewing machine operator with the capability of producing a variety of stitch pattern far beyond that provided by any heretofore known family sewing machine. An early form of such a reprogrammable sewing machine is disclosed in U.S. Pat. No. 4,014,275 of Herr et al. Still other forms of programmable sewing machines are shown in the U.S. Patent Application Ser. Nos. 709,049 now U.S. Pat. No. 4,085,691 and 709,050 now Pat. No. 4,074,642 both filed on July 27, 1976. A high density programming means for a programmable sewing machine is disclosed in the U.S. Pat. application No. 879,338 filed on Feb. 21, 1978.

In the U.S. Patent Application Ser. No. 709,049, there are disclosed two embodiments of a family sewing machine, one having a severable programmable memory unit and the other, an integral programmable memory unit. Access to the programmable memory unit is implemented by a plurality of selector push buttons, preferably aligned in an array of rows and columns so that an operator may visualize thereon the resultant pattern. In the application, each push button generates a discrete voltage which may be encoded by an encoder into binary digits suitable for insertion into the read-write memory for subsequent retrieval therefrom and conversion to an analog form to actuate electro-mechanical actuators such as linear motors. In the U.S. Patent Application Ser. No. 879,338 there is disclosed a high density programming means which provides in compact form, a switch array having a great many columns representative of needle position, and a great many rows related to feed increment. However, it is frequently necessary, for example in monogramming, to enter and store patterns which exceed the capability of the array. What is required is some means to increase the number of rows of pattern information which may be stored without necessitating an increase in the size of the switch array to provide the additional rows which may be required. Ideally, a means is required which is capable of expanding the array in the reverse direction as well as in the forward direction.

SUMMARY OF THE INVENTION

A programmable device is provided with an array of switch points in columns and rows, in which the columns are representative of needle position and the rows are representative of fabric position determined by accumulation of feed increment. Each required feed increment is determined by the change of the present switch position coordinate for feed over the just prior stitch position coordinate for feed.

Thus, selection of a particular switch point determines needle position for a stitch, and determines feed increment from the just prior stitch. In this way, current needle position information and prior feed increment information are determined. Only a finite number of rows for indicating feed increment are provided. Actuation of a particular switch of a switch array is encoded by an encoder into a binary bight signal and a binary feed signal. The binary bight signal may be transferred immediately for storage into a read-write memory. The binary feed signal is transferred to the A terminals of a Feed A-B Subtractor, and to the input terminals of a feed data latch. The output terminals of the feed latch are connected to B terminals of the Feed A-B Subtractor, and the output terminals of the Subtractor are connected to a read-write memory for recording of the feed increment. Each column of the switch array is representative of a binary coded character which is stored in the memory and may be subsequently retrieved and decoded to urge a linear actuator to position a sewing needle in a specific position. Similarly, each row of the switch array is assigned a binary coded character, which may be subtracted in the Feed A-B Subtractor from the immediately preceding binary coded character for feed to determine feed increment. This feed increment is stored in the memory for subsequent retrieval and decoding to urge a linear actuator to reposition the sewing machine feed regulator. Thus, the first row and the last row of the switch array have unique binary coded characters different from each other and from the characters of any other row. If a pattern has been entered into the programming means by depression of selected switch points in the switch array, which pattern is incomplete by the time the last row is reached, a means must be provided to cause the feed latch to output to the B terminals of the Feed A-B Subtractor the binary coded character for the first row of the switch array. In other words, the Feed A-B Subtractor is fed information indicating that the just prior stitch took place on the first row of the switch array. Subsequent selection of a switch point of the switch arrays is then made relative to the first row, and additional pattern information may be entered on the switch array until the position of the last row is once again attained, whereupon the process may be repeated. Alternatively, if the feed increments were substantially in the reverse direction, and the last switch point chosen was at or in the proximity of the first row, a shift reverse button may be depressed which activates a device to load the binary coded character for the last row into the input of the feed latch, and to pulse the feed latch to transfer the input information to the output of the feed latch and to the B terminals of the Feed A-B Subtractor. In this latter case, the Feed A-B Subtractor is supplied with information indicating that the just prior stitch took place on the last row of the switch array, and succeeding switch points may be selected in the reverse direction towards the first row.

DESCRIPTION OF THE DRAWINGS

In the accompanying drawings of a preferred embodiment of the invention:

FIG 4 is a binary code table for the rows and columns of switch points of the programmable memory device of FIG. 2; and, FIG. 5a and b shows the plotting of a monogram requiring operation of the shift forward button of the programmable memory device of FIG. 2.

Figure 1:
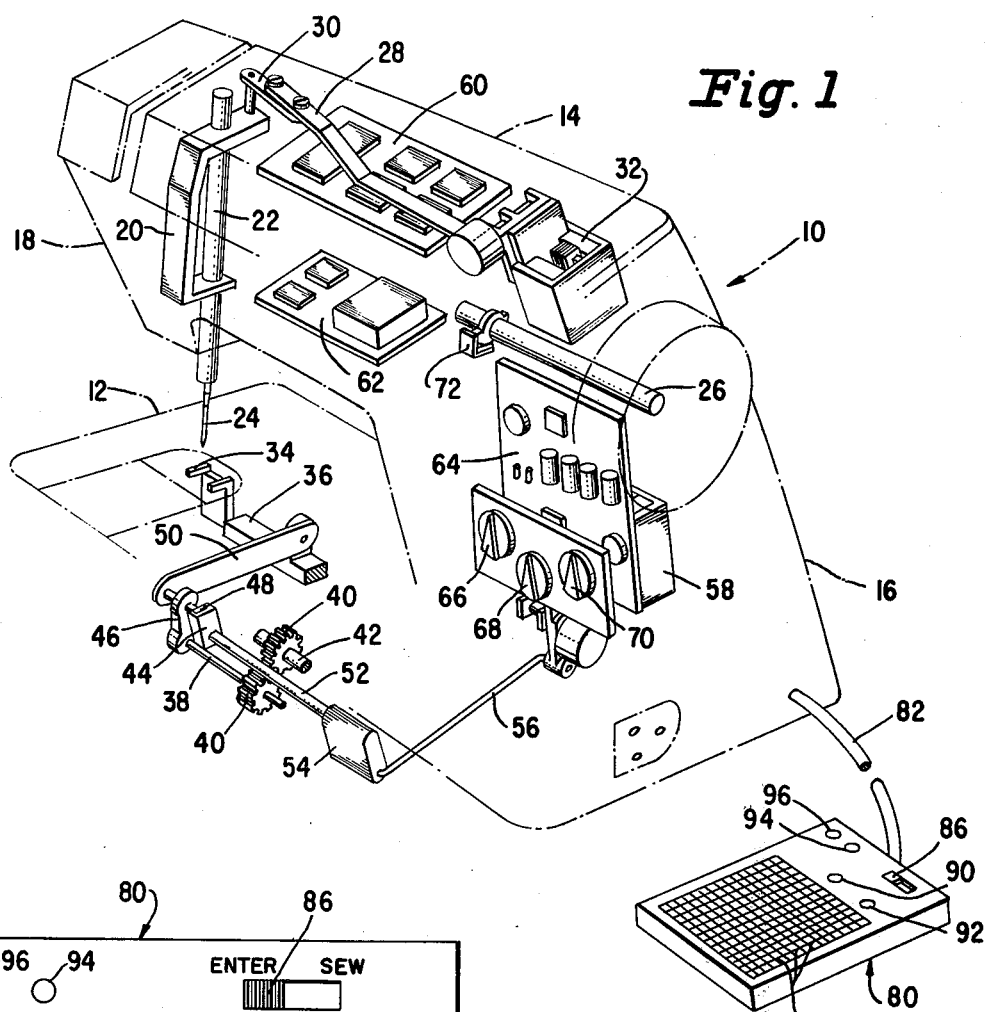
FIG. 1 is a perspective view of a sewing machine of the type used in combination with the present invention, with the frame thereof shown in phantom and components thereof shown in elevation.

Referring to the drawings, in FIG. 1 there is shown a sewing machine casing 10 illustrated in phantom lines, which sewing machine includes a bed 12, a bracket arm 14, and a standard 16 interconnecting the bracket arm with the bed as illustrated. Bracket arm 14 terminates in a head portion 18 within which is supported in a conventional manner a needle bar gate 20, which needle bar gate supports for endwise reciprocation a needle bar 22 carrying at its lower end a needle 24. Endwise reciprocation is imparted to the needle bar 22 by an arm shaft 26 which is rotated by electric motor (not shown) and connected to the needle bar by conventional sewing machine mechanism (not shown) such that the rotary motion of the arm shat 26 is converted to reciprocating motion of the needle bar 22. An actuating arm 28 is connected to the needle bar gate 20 at pivotal connection 30 to convert reciprocating motion of the actuating arm 28, imparted by a linear motor or actuator 32, into pivotal motion of the needle bar gate 20. The linear motor 32 is of the reversible type and may be of the same type as fully described in U.S. Pat. No. 3,984,745 issued on Oct. 5, 1976, and assigned to the same assignee as the present invention. It will be seen therefore that linear motor 32 may be used to determine the lateral position of the needle 24 as it penetrates the fabric disposed on the bed 12 to place thread therethrough at a particular stitch position coordinate.

In order to feed the fabric across the bed 12 in the usual manner, a feed dog 34 is disposed beneath the bed and is supported by feed bar 36. Work transporting motion is imparted to the feed dog 34 by means of a feed drive shaft 38 driven by gears 40 which in turn are driven by a bed shaft 42 connected to the sewing machine arm shaft 26 in a timed relationship by a conventional mechanism (not shown). The feed drive shaft 38 carries an eccentric which is encircled by a pitman 46, the other end of which is connected to a slide block 48 disposed in the slot of a feed regulator 44. The other end of the pitman 46 is also connected to a horizontal link 50 which, in turn, is pivotally connected to the feed bar 36 as shown. Thus, for a given inclination of the feed regulator 44, a predictable horizontal motion of the slide block 48 will result which is transferred to the feed dog 34 by a horizontal link member 50 and the feed bar 36. The inclination of the feed regulator 44 may be adjusted by rotation of the regulator shaft 52 which is fixed to the feed regulator. The regulator shaft 52 has a rock arm 54 affixed thereto at one end, with the rock arm 54 having a rod 56 also connected thereto which in turn is connected to a second reversible linear motor 58. Therefore, the linear motor 58 will be utilized to determine the feed rate of the sewing machine by determining the inclination of the feed regulator 44.

Also shown supported within the sewing machine casing 10 are a variety of printed circuit boards 60, 62, 64 supporting thereon electronic components including a solid state read only memory (ROM) for storage of stitch pattern information utilized to actuate the linear actuators 32, 58. Associated with printed circuit boards 64 are a variety of controls 66, 68, 70 used to adjust, respectively, the bight, balance, and feed signals retrieved from the ROM. A pulse generator 72 is provided and supported adjacent the horizontal arm shaft 26 so as to provide a pulse for signaling the release of stitch pattern information from the ROM at the proper time during each stitch sequence. Further particulars on the operation of an electronically controlled sewing machine may be had by reference to the U.S. Pat. No. 3,872,808 of Wurst, which is assigned to the same assignee as the instant invention, and is hereby incorporated by reference. For the purposes of this invention it is sufficient to state that the pulse generator 72 provides a pulse which is counted up in an address counter 134 to provide a timed series of progresssively increasing binary numbers corresponding to the progressively increasing number of stitches in a pattern. The counter output is coupled to and functions as the address to the ROM which provides a digital output therefrom with information related to the positional coordinates for each stitch of a selected pattern. The output of the ROM is coupled through appropriate circuitry to the linear motors operatively connected to impart a controlled range of movement to the conventional stitch forming instrumentalities of the sewing machine in order to obtain a specific predetermined position coordinate for the needle penetration during each stitch formation and for feed increment after the needle 24 is removed from the work material. Upon the completion of a pattern an end of pattern code word is coupled to the address counter and resets it to the address originally coupled thereto thus providing a continuously repeating stitch pattern. For further particulars on the electronic control arrangement of such a sewing machine, the reader is further referred to the U.S. Pat. No. 4,016,821 of Minalga, assigned to the same assignee as the instant invention, which is hereby incorporated by reference and made a part of this application.

Figure 2:
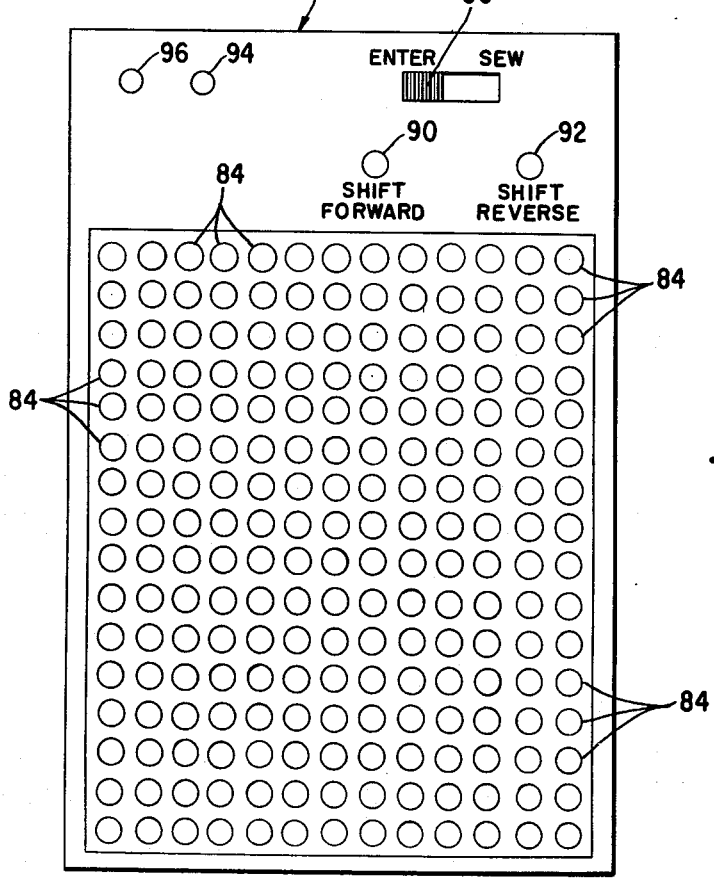
FIG. 2 is a plan view of the programmable memory device shown in FIG. 1.

FIG. 1 further shows a programming device 80 separably connected to the sewing machine 10 by cable 82 and plug means (not shown). The sewing machine 10 may be used as a normal electronically controlled sewing machine, or by insertion of the plug means of the programming device 80 may be receptive to operator imposed patterns by means of the programming device to operate the sewing machine. By insertion of the plug means of the programming device 80 all necessary connections to the sewing machine including power, timing and information transfer connections may be made. The programming device 80 is shown in more particularity in FIG. 2. There is shown in FIG. 2 an array of circles 84 arranged in 13 columns and 16 rows. The circles 84 represent switch points of a high density switching array as disclosed in the U.S. Pat. application No. 879,338 previously referred to. Each of the 13 columns represent a distinct needle position to which the sewing needle 24 may be urged by the linear motor 32. Each row refers to a fabric position that may be attained by a feed increment from a prior row selection. Thus, selection of a circle 84, which may also be referred to as a stitch point or a switch point, will be determinative of a specific needle position of the sewing needle 24, and, when taken in reference to a prior selection of a circle 84, will be determinative of a feed increment from a prior stitch point. Also shown on the programming device 80 of FIG. 2 is a selector switch 86 having enter and sew positions, a shift forward button 90 and shift reverse button 92. There may also be provided an excess feed indicator 94 to indicate selection of a feed increment exceeding the capability of the sewing machine, and an overflow indicator 96 to indicate lack of storage capacity both of which indications may be implemented by LED's (light emitting diodes).

Figure 3:
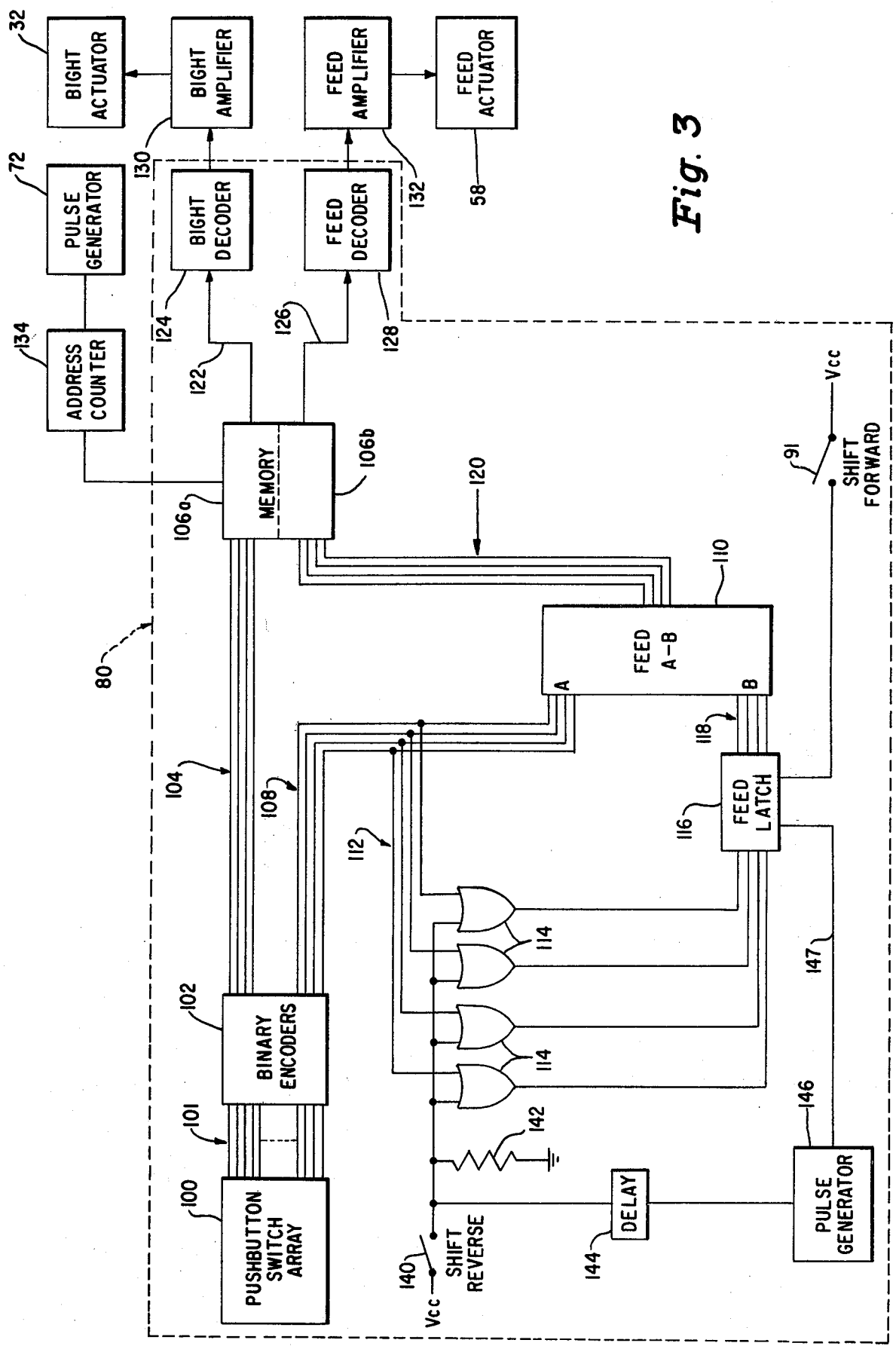
FIG. 3 is a general schematic block diagram showing the components of the programmable memory device illustrated in FIGS. 1 and 2 and its connection to a sewing machine actuator or control mechanism.

Referring now to FIG. 3 there is shown in modified block digrammatic form the various components of the programming device 80 and their attachment to the sewing machine bight and feed amplifiers and actuators. The programming device 80 includes a push button switch array 100 having switch points arranged in rows and columns which are connected by lines 101 to binary encoders 102 for bight and feed. As explained above, depression of a switch point 84 in the push button switch array 100 of the programming device 80 is representative of a specific needle position and of a fabric position that may be attained by a feed increment from a just prior stitch. The binary encoders 102 for bight and feed convert the information obtained from the push button switch array 100 into a bight binary coded character and a feed binary coded character. The bight binary coded character may be transferred on lines 104 to a bight read-write memory 106A for retention therein. The feed binary coded character is transferred by lines 108 to the A input terminals of a feed subtractor 110. Concurrently, the feed binary coded character is transferred via lines 112 to OR logic elements 114, the output of which elements are connected to the input of the feed latch 116. The output of the feed latch 116 is connected by way of lines 118 to the B input terminals of the feed subtractor 110. The output from the feed subtractor 110 is transferred via lines 120 to the feed read-write memory 106B. The bight and feed read-write memory 106A, 106B may be implemented by a single memory or by a pair of memories one for each of bight and feed information. This memory 106A & B is not the ROM referred to above but a memory associated with the programming device 80. In any event, as indicated above, upon selection of a specific switch point 84 of the programming device 80 a specific binary coded character for bight is stored in the memory 106A and a binary coded character for the feed increment from the previous stitch is obtained from the feed subtractor 110, which deducted the previous feed stitch position coordinate (B) from the present feed stitch position coordinate (A) and stored this prior stitch feed increment for release in an automatic mode when the sewing needle 24 penetrates the work material during placement of a stitch according to the bight binary coded character of the previous stitch. The previous stitch feed coordinate (B) is obtained from the feed latch 116. When a new switch point 84 is selected, storage in the memory 106B take place of the output of the feed subtractor 110, after which an internal timing pulse in the programming device 80 transfers the data on the input of the feed latch 116B the output thereof, and subsequently to the B input of feed subtractor 110, in readiness for the next switch selection. Thus, the bight binary coded character for each switch point 84 selected is obtained immediately, and by utilizing the feed subtractor 110 a feed binary coded character representative of the feed increment from the just prior stitch is obtained by subtracting the prior feed coordinate information from the present feed coordinate information.

In order to fully understand how the invention may be implemented the binary coded table of FIG. 4 may be referred to. Each column of switch points 84 in the programming device 80 may be assigned a binary coded character as indicated in the table. Thus, all the switch points 84 in column 1 utilize a bight binary coded character 0000. Similarly, each switch point 84 selected in column 8, for example, initiates the binary coded character for bight of 0111, and each switch point 84 in column 13 inititates the binary coded character 1100. Also, each row of switch points 84 in the programming device 80 is assigned a distinct binary coded character. Thus, row 1 is assigned the binary coded character 0000, whereas row 16 is assigned the binary coded character 1111. Since feed increment is determined with reference to the just prior stitch, represented by B in the feed substractor 110, the insertion of artificial data into the B entry of the feed subtractor will have the effect of initiating feed cycle from that point represented by the artifical data. Thus, where during the recording of a pattern sufficient information has been entered to cover all the available rows and there are no further rows upon which information may be entered, an artifical 0000 signal may be impressed upon the B input of the feed subtractor 110 and further feed increments made from row 1. This may be accomplished most efficaciously by depression of the shift forward button 90 which operates switch 91 to clear the input of the feed latch 116 and to transfer the input thereof to the output along lines 118 to the B terminal of the feed substractor 110. Further stitch selection may then be accomplished relative to the first row and this process may be repeated as frequently as is necessary.

Referring now to FIG. 5A and B, there is shown for example, how the name PAUL may be stored in the memories 106A, 106B of the programming device 80. By way of example, the switch points 84 are indicated at the intersection of the lines generated by 13 columns and 16 rows. By use of a graphical form of this sort an operator with a slight degree of skill may generate her own patterns. The succession of stitches is shown in FIG. 5 by the progression of numbers from 1 to 26 in FIG. 5a and from 1 to 19 in FIG. 5b. In the formation of this monogram it frequently becomes necessary to repenetrate a prior needle opening in the formation of the pattern. Thus, for example, stitch 1 is repenetrated at the 10th stitch and opening 2 is repenetrated at the 9th stitch. Each stitch may include a needle positioning without feed increment, or feed increment without needle repositioning or may require a change of needle position and a feed increment. In the formation of the PA shown in FIG. 5A, 26 stitches are required. After selection of the 26 stitches in the first column and 16th row, an operator may depress the shift forward button 90, thereby activating the clear input of the feed latch 116 and transferring the cleared input to the output and via lines 118 to the B input of the feed subtractor 110. Thus, so far as the programming device 80 is concerned, the stitch just selected took place on row 1 of the programming device. Selection of a switch point 84 may then proceed according to FIG. 5B. In FIG. 5B the first stitch selected is on the third row indicating a feed increment of two units from stitch 26 of FIG. 5A, and on the second solumn indicating a shift of needle position two units from the extreme left position. The desired stitches are then entered sequentially as numbered 1 through 19. When the 19th stitch has been entered the selector switch 86 may be shifted to the sew position. Upon actuation of the sewing machine 10 with the selector switch 86 in the sew position, the memory 106A will release information along line 122 (see FIG. 3) to bight decoder 124, and memory 106B will release information along line 126 to the feed decoder 128. The decoders 124, 128 will process information released from the memory 106 to an analog form which may be used by bight amplifier 130 and feed amplifier 132 for operation of the bight 32 and feed 58 linear motors. AS explained in the above referenced patents, the pulse generator 72 is effective on each stitch to release a pulse which is counted up in address counter 134 and applied as an address to the memory 106 to obtain release of the sequential stored information therefrom.

Thus has been explained a device by which a forward shift of the programming device 80 may take place by insertion of an artifically generated signal representative of the first row of switch points 84 when proximate the last row thereof. It will be understood that the process explained above may be repeated several times, limited only by the capacity of the memory 106, until a complete stitch pattern has been entered. By way of example, a stitch pattern was disclosed which will result in the monogramming of the name PAUL. It will also be appreciated that any ornamental pattern may be substituted in place of the monogram described. What remains to be described is a means for providing for a shift reverse in the event that a pattern having a large amount of feed in the reverse direction is desired. In this event, some means must be found for generating an artifical signal having the characteristic binary coded character for the last row of the programming device 80. Referring to the table of FIG. 4, the binary coded character for the 16th row is 1111. Referring to FIG. 3 it will be noted that OR gates 114 were inserted in the lines 112 leading to the feed input of the feed latch 116. The lines 112 feed one input of the OR gate 114 and the output thereof is connected to the input of the feed latch 116. The second input of the OR gates 114 are connected together and to a voltage source Vcc through a switch 140. A pull-down resistor 142 connects the second input to the OR gates 114 to ground. With the switch 140 open, a high on lines 112 will cause the OR gates 114 to output the corresponding high to the input of the feed latch 116. A low on lines 112 will cause the OR gates 114 to output a low to the input of the feed latch 116. When a switch point 84 if not depressed, all of the lines 112 will input a low to the OR gates 114. When the switch 140 is closed by operation of the shift reverse button 92, the second input to the OR gates 114 will be a high causing the OR gates to output a high to the input of the feed latch 116. Simultaneously, the application of voltage Vcc to a delay 144 will create a delay of approximately 50 microseconds prior to triggering of a pulse generator 146. The output of the pulse generator 146 will be carried via line 147 to the feed latch 116 causing the input of the feed latch to shift to the output and applying the binary coded characer 1111 via lines 118 to the B terminal of the feed subtractor 110. Thus programming of the programming device 80 may proceed as though the immediately prior stitch had been on the last or 16th row.

It will be apparent to those skilled in the art that logic means may be provided to generate any binary coded character. Thus although 16 rows were disclosed in this embodiment any number of rows may be used.

Having thus set forth the nature of the invention, what is claimed herein is:

1. A programming device for a sewing machine having stitch forming means including a sewing needle and feeding system, said stitch forming means being operative to form successive stitches and including mechanisms for influencing stitch position coordinates of said successive stitches in the formation of a pattern of stitches, said sewing machine further including logic means responsive to input data representative of stitch position coordinates for producing stitch position coordinate electrical signals, actuating means responsive to signals from said logic means for controlling the position of said stitch forming means in accordance with input data fed to said logic means, said programming device being operably connected with said sewing machine and including memory means operative for storing digital input data corresponding to a stitch pattern selected by the operator and for transmitting electrical digital output signals to said logic means such that an operator may select a stitch pattern program for entry into the sewing machine for automatic reproduction of the stitch pattern by the sewing machine, said programming device further including a plurality of operator manipulating means each for generating stitch position coordinate information, said operator manipulating means being arranged in an array of columns and rows related, respectively, to selected lateral position of needle penetration and to selected feed increment from a just prior stitch position coordinate for feed, each row of said array of said operator manipulating means being assigned a digital coded character as a stitch position coordinate for feed and manipulation of any of said operator manipulating means in a given row will generate a specific stitch position coordinate for feed, said programming device including a feed data latch for preserving a current stitch position coordinate for feed for subsequent use as a just prior stitch position coordinate for feed and a feed subtractor to obtain the feed increment of the current stitch position coordinate for feed over the just prior stitch position coordinate for feed, wherein the improvement comprises; means for originating an artificial signal representative of a new starting point, and means for inserting said artificial signal in said feed subtractor in place of said just prior stitch position coordinate for feed.

2. A programming device as claimed in claim 1 wherein said originating means includes the capability for producing the specific stitch position coordinate for feed of the first row of said operator manipulating means.

3. A programming device as claimed in claim 2 wherein said originating means further includes means for originating the specific stitch position coordinate for feed of the last row of said operator manipulating means.

4. A programming device as claimed in claim 1 wherein the digital coded character assigned as the stitch position coordinate for feed of the first row of said array of said operator manipulating means is a series of zeros and wherein said feed data latch includes means for clearing the input thereof of the current stitch position coordinate for feed in favor of a series of zeros and means for transferring the cleared input of the feed data latch to the output thereof for presentation as a just prior stitch position coordinate for feed to the feed subtractor.

5. A programming device as claimed in claim 4 wherein said originating means includes logic means effective on operator command to generate the specific stitch position coordinate for feed of the last row of said operator manipulating means for insertion into the input of said feed data latch and to transfer the inserted data from the input to the output of the feed data latch for presentation to the feed subtractor as the just prior stitch position coordinate for feed.

* * * * *